United States Patent
Pelleg et al.

(10) Patent No.: US 8,307,164 B2
(45) Date of Patent: Nov. 6, 2012

(54) AUTOMATIC DETERMINATION OF READ-AHEAD AMOUNT

(75) Inventors: Dan Pelleg, Haifa (IL); Eran Raichstein, Yokneam Ilit (IL); Amir Ronen, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 409 days.

(21) Appl. No.: 12/637,938

(22) Filed: Dec. 15, 2009

(65) Prior Publication Data

US 2011/0145508 A1  Jun. 16, 2011

(51) Int. Cl.
G06F 12/02  (2006.01)
(52) U.S. Cl. .................. 711/137; 711/E12.004; 706/47
(58) Field of Classification Search .................. 711/137, 711/E12.004; 706/47
See application file for complete search history.

(56) References Cited

U.S. PATENT DOCUMENTS

| | | | |
|---|---|---|---|
| 5,353,430 A | 10/1994 | Lautzenheiser | |
| 6,871,246 B2 | 3/2005 | Moyer | |
| 7,130,967 B2 | 10/2006 | Arimilli et al. | |
| 7,238,218 B2 | 7/2007 | Hepner et al. | |
| 7,383,392 B2 | 6/2008 | Mark et al. | |
| 7,434,004 B1 | 10/2008 | Sparcklen et al. | |
| 7,512,740 B2 | 3/2009 | Diefendorff | |
| 7,516,279 B2 | 4/2009 | Griswell, Jr. et al. | |
| 7,552,311 B2 | 6/2009 | Hara et al. | |
| 7,565,494 B1 | 7/2009 | Todd et al. | |
| 2003/0120865 A1 | 6/2003 | McDonald et al. | |
| 2008/0005481 A1 | 1/2008 | Walker | |
| 2008/0270706 A1 | 10/2008 | Fair et al. | |
| 2009/0198905 A1 | 8/2009 | Armilli et al. | |

OTHER PUBLICATIONS

P. Auer, N. Cesa-Bianchi, Y. Freund, and R.E. Schapire, "The nonstochastic multiarmed bandit problem SIAM Journal on Computing", 32(1):48-77, 2002.
Joannes Vermorel et al, "Multi-Armed Bandit Algorithms and Empirical Evaluation", 2005, http://www.springerlink.com/content/f588783215535858/.
Ahmed Amer et al, "Noah: Low-Cost File Access Prediction Through Pairs", 2001, http://ieeexplore.ieee.org/xpl/freeabs_all.jsp?arnumber=918632.
Shuang Liang et al, "Step: Sequentiality and Thrashing Detection Based Prefetching to Improve Performance of Networked Storage Servers", 2007, http://ieeexplore.ieee.org/xpl/freeabs_all.jsp?arnumber=4268217.

*Primary Examiner* — Yong Choe
(74) *Attorney, Agent, or Firm* — Ziv Glazeberg; Glazberg, Applebaum & co.

(57) ABSTRACT

Read-ahead of data blocks in a storage system is performed based on a policy. The policy is stochastically selected from a plurality of policies in respect to probabilities. The probabilities are calculated based on past performances, also referred to as rewards. Policies which induce better performance may be given precedence over other policies. However, the other policies may be also utilized to reevaluate them. A balance between exploration of different policies and exploitation of previously discovered good policies may be achieved.

24 Claims, 3 Drawing Sheets

AUTOMATIC DETERMINATION OF READ-AHEAD AMOUNT

BACKGROUND

The present disclosure relates to storage system in general, and to automatic determination of amount of read-ahead by the storage system in particular.

Storage system enable user to retrieve data stored in storage devices, such as a hard disk drive, a removable storage device, Redundant Array of Inexpensive Disks (RAID), Random Access Memory (RAM), Flash memory, removable media or the like. Data is stored in a the storage device in data blocks, which may be read or written based on requests, commands, rules or the like. Upon a retrieval request, the storage system may access the storage device and retrieve pertinent data blocks. The time that takes a retrieval request to be completed is comprised by the factors: latency time and read time. The latency time is generally not dependent of the number of data blocks being read, whereas the read time is generally linear in the number of data block being read.

Some storage systems attempt to reduce a cumulative time of performing retrieval requests by reading additional data blocks, not yet requested, and caching the additional data blocks. This procedure is referred to as read-ahead. In case the additional data blocks are requested, a latency time may be spared. However, in case the additional data blocks are never requested, or requested after being removed from a cache memory, surplus read time was added. Therefore, performing unnecessary read-ahead may significantly increase the performance time of the storage system, in contrast to the purpose of the read-ahead procedure.

BRIEF SUMMARY OF THE INVENTION

One exemplary embodiment of the disclosed subject matter is a computerized apparatus having a processor, the computerized apparatus comprising: a reward calculator configured to calculate a reward associated with a first read-ahead policy based on a performance of the first read-ahead policy by a storage system during a first phase; a probability module configured to determine a probability to select each of read-ahead policies, said probability module is configured to determine the probability based on the reward calculated by said reward calculator; and a read-ahead policy selector configured to select a second read-ahead policy for a second phase from the read-ahead policies based on the probability determined by said probability module.

Another exemplary embodiment of the disclosed subject matter is a method for determining read-ahead amount in a computerized environment, said method comprising: calculating a reward of performing a first read-ahead policy by a storage system during a first phase; determining a probability to select each of read-ahead policies based on the reward; selecting a second read-ahead policy based on the probability to select each of the read-ahead policies; performing read-ahead retrieval based on the second read-ahead policy during a second phase, whereby a retrieval request from the storage system is transformed to comprise an additional read-ahead block.

Another exemplary embodiment of the disclosed subject matter is a computer program product embodied on a computer readable storage media having computer code embodied therein for processing a method for determining read-ahead amount in a computerized environment as disclosed in the subject matter.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
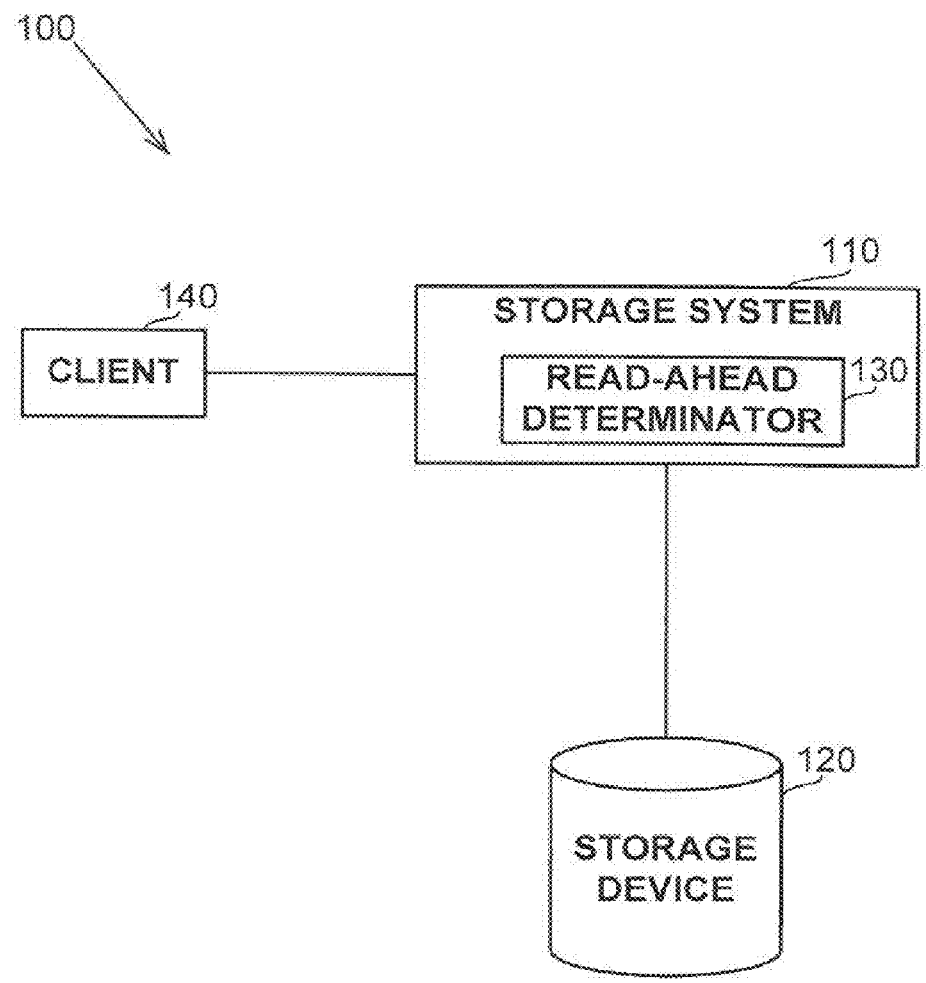
FIG. 1 shows a computerized environment in which the disclosed subject matter is used, in accordance with some exemplary embodiments of the subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to determine amount of data blocks to read-ahead. Another technical problem dealt with by the disclosed subject matter is to automatically determine the amount of data blocks to read-ahead. Yet another technical problem is to calculate a reward gained by utilizing a read-ahead policy. Yet another technical problem is to provide an adaptive solution to the amount of read-ahead problem.

One technical solution is to stochastic select of a policy based on previous utilization of different read-ahead policies. Another technical solution is to utilize a read-ahead policy during a phase and determine a reward associated with the read-ahead policy during the phase. Yet another technical solution is to determine probabilities of selecting each read-ahead policies based on rewards. Yet another technical solution is to divide segments of operation of a storage system to phases based on amount of retrieved data blocks, elapsed time, and the like.

One technical effect of utilizing the disclosed subject matter is retrieving data blocks from a storage device without being requested by a client of a storage system. Another technical effect of utilizing the disclosed subject matter is achieving a balance between exploration of different read-ahead policies and exploitation of relatively good read-ahead policies. Yet another technical effect is segmenting a substantially continuous operation of a storage system to discrete phases.

Referring now to FIG. 1 showing a computerized environment in which the disclosed subject matter is used, in accordance with some exemplary embodiments of the subject matter. A computerized environment 100 may comprise a storage system 110 and a storage device 120. In some exemplary embodiments, the storage system 110 may comprise the storage device 120.

In some exemplary embodiments of the disclosed subject matter, the storage system 110 may be configured to enable storage of data in the storage device 120. The storage system 110 may be configured to retain data and retrieve data from the storage device 120. The storage system 110 may be for example a computer server, a driver for a hard disk, a tape storage system, a Storage Area Network (SAN), a Network Attached Storage (NAS), a disk system or the like. The storage device 120 may be Random Access Memory (RAM), a tape, a removable media such as a Compact Disc (CD), a flash memory, a hard disk drive, a removable storage device, Redundant Array of Inexpensive Disks (RAID) or the like. In some exemplary embodiments, the storage system 110 may utilize several storage devices (not shown), which may or may not be of a same type.

In some exemplary embodiments of the disclosed subject matter, a client 140 of the storage system 110 may utilize the storage system 110. The client 140 may be a user (not shown) operating in the computerized environment 100 with a computer terminal (not shown), a remote computer accessing data, an operating system, a file system, a computer program or the like. The client 140 may issue a retrieval request to the storage system 110. The retrieval request may be of a request to retrieve one or more data blocks stored in the storage device 120. It will be noted that the client 140 may be unaware of the address of the one or more data blocks, on which storage device they are stored or other characteristics. In some exemplary embodiments, several clients (not shown) may utilize the storage system 110 such as for example multiple users, concurrently executed processes and the like.

In some exemplary embodiments of the disclosed subject matter, the storage system 110 may comprise a read-ahead determinator 130. The read-ahead determinator may determine how many read-ahead data blocks may be retrieved from the storage device 120. The read-ahead data blocks may be stored in a cache (not shown) and fetched in case the client 140 requests retrieval of the read-ahead data blocks. It will be noted that the client 140 may be unaware that the data blocks were read-ahead. The storage system 110 may encapsulate or hide the read-ahead system.

In some exemplary embodiments of the disclosed subject matter, the client 140 may request a set of sequential data blocks in two or more retrieval request. In such a scenario, reading-ahead the set of sequential data blocks may be useful to decrease an overall time that the storage system 110 operates in, hereinafter also referred to as time of the storage system 110.

In some exemplary embodiments, the client 140 may request a set of substantially sequential data blocks in two or more retrieval requests. For example, a set of substantially sequential data blocks may comprise a first sequence of data blocks and a second sequence of data blocks, wherein a last data block of the first sequence is relatively adjacent to a first data block of the second sequence. As an example, the last data block and the first data block may be separated by a relatively small number of data blocks, such as for example fifty data blocks. In such a scenario reading-ahead set of sequential data blocks that comprise the substantially sequential data blocks may be useful to decrease an overall time of the storage system 110.

Figure 2:
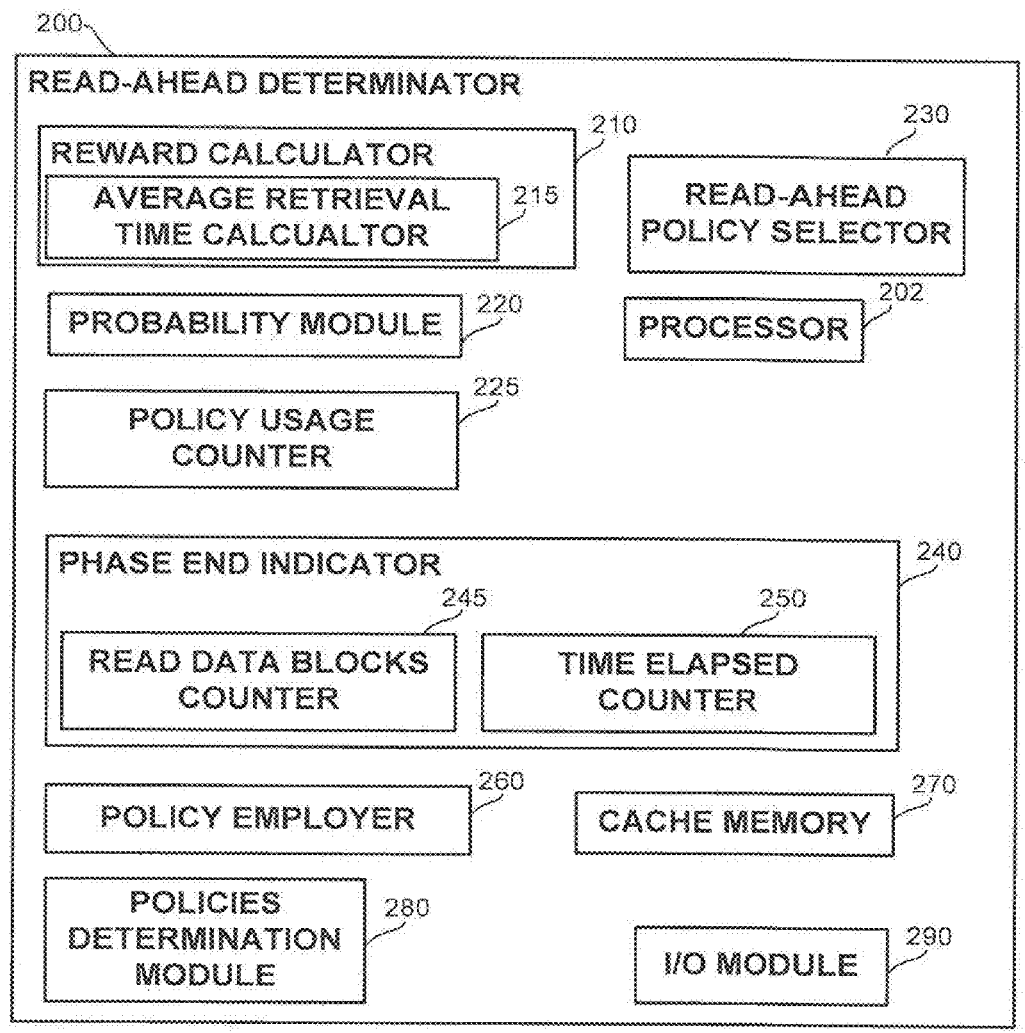
FIG. 2 shows a block diagram of a read-ahead determinator in accordance with some exemplary embodiments of the disclosed subject matter.

Referring now to FIG. 2 showing a block diagram of a read-ahead determinator in accordance with some exemplary embodiments of the disclosed subject matter. A read-ahead determinator 200, such as 130 of FIG. 1, may be configured to determine how much read-ahead may be performed in respect to a retrieval request.

In some exemplary embodiments of the disclosed subject matter, the read-ahead determinator 200 may segment an operation of a storage system to phases. In some exemplary embodiments, the segmentation may be performed by an auxiliary device, a user or the like.

In some exemplary embodiments of the disclosed subject matter, the read-ahead determinator 200 may comprise a reward calculator 210. The reward calculator 210 may calculate a reward of utilizing an employed read-ahead policy, as is disclosed below. The reward may be normalized between zero and one, wherein a higher reward indicates that the employed read-ahead policy is useful. The reward may depend on average retrieval time of data blocks during the phase, number of hits of a cache memory 270 associated with read-ahead data blocks, utilization of communication bandwidth to or from the read-ahead determinator 200 during the phase, throughput of a communication channel associated with the read-ahead determinator 200 during the phase or the like. In an exemplary embodiment, the reward may be calculated as C−T/B, where C may be constant number, such as one, T may be an average time per data block requested to be retrieved by a client, such as 140 of FIG. 1, during the phase, and B may be a bound on a value of T, such as for example a maximal time to retrieve a single block. The average time per data block may be calculated by an average retrieval time calculator 215. The average retrieval time calculator 215 may determine how long the storage system, such as 110 of FIG. 1, has operated in response to retrieval requests and divide it by a number of data blocks that were requested. The average retrieval time calculator 215 may ignore read-ahead data blocks that were retrieved but not later requested by the client.

In some exemplary embodiments of the disclosed subject matter, the read-ahead determinator 200 may comprise a policies determination module 280. The policies determination module 280 may be configured to determine one or more read-ahead policies. The read-ahead policies may be determined based on user input, commands, rules or the like. The read-ahead policies may be determined based on a configuration file and the like.

In some exemplary embodiments of the disclosed subject matter, a read-ahead policy may be configured to determine an amount of read-ahead data blocks to read-ahead. The read-ahead policy may be provide a fixed number read-ahead data blocks, may calculate a number of read-ahead data blocks based on parameters, configurations, a state of the storage device, a history of retrieval requests and the like. For example, the read-ahead policy may determine that in case some of recent retrieval requests were for a same number of blocks, such as ten data blocks, and were directed to consecutive memory space, and the current retrieval request is for additional ten data blocks successive of the consecutive memory space, a read-ahead of additional blocks may be performed. The read-ahead policy may identify whether a client is repeatedly accessing a same region the storage device. The read-ahead policy may identify whether a client is accessing a predetermined region of the storage device, such as a memory page stored in the storage device, and determine a read-ahead of the entire predetermined region. Other read-ahead policies may apply, enabling different read-ahead behaviors based on input to the read-ahead policies.

In some exemplary embodiments of the disclosed subject matter, the read-ahead determinator 200 may comprise a policy usage counter 225. The policy usage counter 225 may count a number of phases in which a read-ahead policy was utilized. For example, the policy usage counter 225 may increment a counter associated with the read-ahead policy upon selection of the read-ahead policy by a read-ahead policy selector 230, as is detailed below. It will be noted that the policy usage counter 225 may maintain and update a plurality of counters, such that each may be associated with a different read-ahead policy.

In some exemplary embodiments of the disclosed subject matter, the read-ahead determinator 200 may comprise a probability module 220. The probability module 220 may be configured to determine a probability to select each of the read-ahead policies. The read-ahead policies may be predetermined read-ahead policies. The read-ahead policies may be determined by the policies determination module 280. The probability module 220 may initially determine initial probabilities, such as for example initial probabilities according to a uniform distribution. The probability module 220 may update, recalculate or otherwise determine the probabilities based on parameters, rules, algorithms or the like. The probability module 220 may determine the probabilities based on previously determined probabilities. The probability module 220 may determine a probability associated with a read-ahead policy according to an expected reward of the read-ahead policy. The probability module 220 may determine the probability according to a reward of the read-ahead policy as determined by the reward calculator 210. In some exemplary embodiments, the probabilities may be according to a distribution that is a mixture of uniform distribution and a distribution which assigns to each read-ahead policy a probability mass exponential in the estimated cumulative reward for that read-ahead policy. In some exemplary embodiments, the probability module 220 may determine the probabilities based on algorithms solving a multiarmed bandit problem, such as for example algorithms disclosed in P. Auer, N. Cesa-Bianchi, Y. Freund and R. E. Schapire, "The nonstochastic multiarmed bandit problem", SIAM Journal on Computing, 32(1):48-77, 2002.

In some exemplary embodiments of the disclosed subject matter, the probability module 220 may determine the probability such that to provide a balance between exploitation of a first read-ahead policy that was determined to be beneficial in previous phases and exploration of a second read-ahead policy that was not utilized a relatively small number of times. For example, the first read-ahead policy may be associated with a relatively high reward determined by the reward calculator 210. The second read-ahead policy may be associated with a relative small count determined by the policy usage counter 225. In some exemplary embodiments, the probability module 220 may determine the probabilities such that a first policy having a first expected reward is associated with a higher probability than a second policy having the first expected reward, based on the first policy being associated with a lower usage count than the second policy. In some exemplary embodiments, the probability module 220 may determine the probabilities such that a first policy having a first usage count is associated with a higher probability than a second policy having the first usage count, based on the first policy being associated with a higher expected reward than the second policy.

In some exemplary embodiments of the disclosed subject matter, a read-ahead policy selector 230 may be configured to select a read-ahead policy from the read-ahead policies. The read-ahead policy selector 230 may be configured to select the read-ahead policy in accordance with the probabilities determined by the probability module 220. The read-ahead policy selector 230 may be configured to stochastically select the read-ahead policy.

In some exemplary embodiments of the disclosed subject matter, a policy employer 260 may act upon a read-ahead policy. The policy employer 260 may determine amount of read-ahead data blocks to read-ahead from the storage device according to a read-ahead policy selected by the read-ahead policy selector 230. The policy employer 260 may be configured to gather data utilized by the reward calculator 210 to determine a reward of the read-ahead policy.

In some exemplary embodiments of the disclosed subject matter, the read-ahead determinator 200 may comprise a cache memory 270. The cache memory 270 may be utilized to retaining read-ahead data blocks. A hit on the cache memory 270 may indicate that a data block associated with a retrieval request was previously read-ahead. The hit may indicate that the read-ahead policy was beneficial and to what extent.

In some exemplary embodiments of the disclosed subject matter, the read-ahead determinator 200 may comprise a phase end indicator 240. The phase end indicator 240 may be utilized in segmenting the operation of the storage system to phases. The phase end indicator 240 may indicate that a segment, also referred to as a phase, has ended and that a new segment begins. The phase end indicator 240 may raise an interrupt, utilize asynchronous or synchronic communication method, or otherwise indicate the end of the phase to the read-ahead determinator 200. A phase may be defined as comprising a predetermined number of data blocks requested to be retrieved. A phase may be defined as a predetermined timeframe of operation, such as a second, ten seconds, a minute or the like. In some cases, the timeframe may vary according to utilization of the storage system, such as for example ten milliseconds during peak utilization time, such as noon, and ten seconds during low utilization time, such as weekends, holidays or nights. In response to an indication that an ending phase has ended by the phase end indicator 240, the probability module 220 may reevaluate probabilities associated with read-ahead policies, the reward calculator 210 may calculate a reward during the ending phase, the read-ahead policy selector 230 may select another read-ahead policy and the like.

In some exemplary embodiments of the disclosed subject matter, the phase end indicator 240 may comprise a read data blocks counter 245. The read data blocks counter 245 may be configured to count a number of data blocks requested by clients of the storage system. For example, the read data blocks counter 245 may not count a read-ahead data block that was retrieved by the policy employer 260, unless it was later on request by a client in a retrieval request. In some exemplary embodiments, the phase end indicator 240 may determine that a phase may end after a limit of data blocks is retrieved. The number of read data blocks counted by the read data blocks counter 245 may be utilized to determine whether the limit was reached. In some exemplary embodiments, a phase may end in a middle of serving a retrieval request. For example, a retrieval request of twenty data blocks, may have a first portion, such as five blocks, associated with a first phase and a second portion, such as fifteen blocks, associated with a second phase. It may be beneficial to determine a limit that is significantly greater than a maximum number of read-ahead data blocks that are read in a association with a retrieval request.

In some exemplary embodiments of the disclosed subject matter, the phase end indicator 240 may comprise a time elapsed counter 250 utilize to count elapsed time of operation of the storage device. The time elapsed counter 250 may ignore idle time of the storage system. The time elapsed counter 250 may be utilized by the phase end indicator 240 to determine that a phase ended. In some exemplary embodiments, a phase may be deemed to end after a predetermined timeframe.

In some exemplary embodiments of the disclosed subject matter, the read-ahead determinator 200 may comprise an Input/Output (I/O) module 290. The I/O module 290 may be utilized to retrieve a bound from a user, such as provided using an input device, retained in a configuration file or the like. The bound may be a maximal time for a retrieval request bound. The maximal time for retrieval request bound may be utilized in normalizing a reward. The bound may be a maximal amount of read-ahead data blocks bound. The maximal amount of read-ahead data blocks bound may be utilized in determining the limit of a phase, used by the phase end indicator 240. In some exemplary embodiments, a bound may be validated by the read-ahead determinator 200. For example, a bound on a time for retrieval request may be validated by the policy employer 260. The policy employer 260 may detect a retrieval request that took more than the maximal time for retrieval request bound. In case the bound is falsified, the bound may be updated such that the updated bound may be correct, for example, by increasing the original bound.

In some exemplary embodiments, the I/O module 290 may be an interface, such as an Application Programming Interface (API), an eXtensible Markup Language (XML) interface, a user interface, a communication protocol or the like, to the storage system. The interface may be configured to enable the read-ahead determinator 200 to determine whether a retrieval request has been requested by the client. The interface may modify a retrieval request to further comprise a request to retrieve one or more additional data blocks, such as one or more read-ahead data blocks. The interface may intercept the retrieval request, and provide a modified request instead. The storage system may utilize the read-ahead determinator 200 using the interface, such that the read-ahead determinator 200 may determine amount of read-ahead data blocks to be retrieved in response to a retrieval request. In some exemplary embodiments, the storage system may be unaware of the presence of the read-ahead determinator 200 as it may function as a client of the storage system. In some exemplary embodiments, a client may unaware of the presence of the read-ahead determinator 200 as it may provide an interface of a storage system, such that a client may act as if it is accessing a storage system directly. The read-ahead determinator 200 may utilize the I/O module 290 to provide a proxy interface to the client, the storage system or the like.

In some exemplary embodiments, the read-ahead determinator 200 may comprise a processor 202. The processor 202 may be a Central Processing Unit (CPU), a microprocessor, an electronic circuit, an Integrated Circuit (IC) or the like. The processor 202 may be utilized to perform computations required by the read-ahead determinator 200 or any of it subcomponents.

Figure 3:
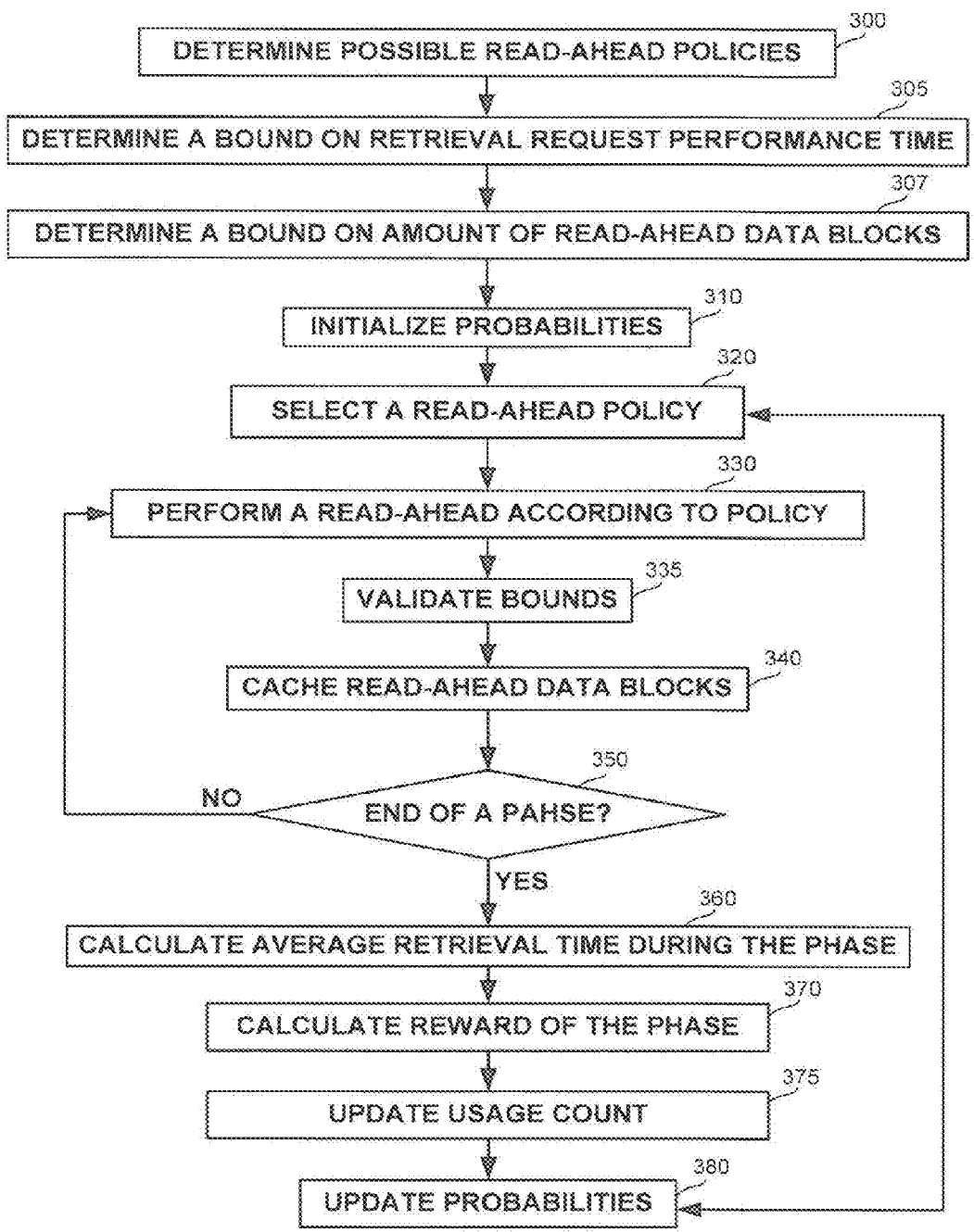
FIG. 3 shows a flowchart diagram of a method in accordance with some exemplary embodiments of the disclosed subject matter.

Referring now to FIG. 3 showing a flowchart diagram of a method in accordance with some exemplary embodiments of the disclosed subject matter.

In step 300, possible read-ahead policies may be determined. The possible read-ahead policies may be determined by a policies determination module, such as 280 of FIG. 2.

In step 305, a bound on retrieval request performance time may be determined. The bound may be determined based on information, such as user input, retrieved by an I/O module, such as 290 of FIG. 2. The bound may be determined in respect to previous execution of a read-ahead determinator, such as 200 of FIG. 2.

In step 307, a bound on amount of read-ahead data blocks may be determined. The bound may be determined based on information retrieved by an I/O module such as 290 of FIG. 2. The bound may be determined in respect to previous execution of a read-ahead determinator, such as 200 of FIG. 2.

In step 310, a set of probabilities associated with read-ahead policies may be initialized. The probabilities may be set in accordance with a uniform distribution. The probabilities may be set in accordance with previous execution of a read-ahead determinator, such as 200 of FIG. 2. The probabilities may be set by a probability module, such as 220 of FIG. 2.

In step 320, a read-ahead policy may be selected. The read-ahead policy may be selected by a read-ahead policy selector, such as 230 of FIG. 2.

In step 330, a read-ahead may be performed in accordance to the read-ahead policy. The read-ahead may be performed in respect to a retrieval request from the storage system. The read-ahead may be performed by a policy employer, such as 260 of FIG. 2.

In step 335, bounds, such as bounds determined in steps 305 or 307, may be validated in respect to an operation of the storage system.

In step 340, read-ahead data blocks retrieved in step 330 may be stored in a cache memory, such as 270 of FIG. 2.

In step 350, a determination may be made whether a phase has ended. The determination may be performed by a phase end indicator, such as 240 of FIG. 2. The determination may be performed during a retrieval request that is processed by the storage system. In case the phase has not ended, any of steps 330, 335, 340 may be performed again until the phase ends. In response to a determination of an ending of a phase, step 360 may be performed.

In step 360, an average retrieval time during the phase may be calculated. The calculation may be performed by an average retrieval time calculator, such as 215 of FIG. 2.

In step 370, a reward may be calculated. The reward may be calculated based on the average retrieval time during the phase. The reward may be normalized. The reward may be normalized using a bound, such as a retrieval request performance time bound. In some exemplary embodiments, the reward may be calculated based on other parameters and step 360 may be omitted. The calculation may be performed by a reward calculator, such as 210 of FIG. 2.

In step 375, usage count associated with the read-ahead policy may be updated. The usage count may be updated by a policy usage count, such as 225 of FIG. 2.

In step 380, probabilities of selecting read-ahead policies may be updated. The probabilities may be determined by a probability module, such as 220 of FIG. 2. The probabilities may be determined based on a reward calculated in step 370, based on a usage count determined in step 375, a combination thereof, or the like. In some exemplary embodiments, the probabilities may be determined also based on past rewards of policies, usage counts of policies or the like.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computerized apparatus having a processor, the computerized apparatus comprising:
   a reward calculator configured to calculate a reward associated with a first read-ahead policy based on a performance of the first read-ahead policy by a storage system during a first phase;
   a probability module configured to determine a probability to select each of read-ahead policies, said probability module is configured to determine the probability based on the reward calculated by said reward calculator; and
   a read-ahead policy selector configured to select a second read-ahead policy for a second phase from the read-ahead policies based on the probability determined by said probability module.

2. The computerized apparatus of claim 1 further comprising a phase end indicator configured to indicate an end of the first phase and a beginning of the second phase.

3. The computerized apparatus of claim 2, wherein said phase end indicator further comprises a read data blocks counter.

4. The computerized apparatus of claim 2, wherein said phase end indicator further comprises a time elapsed counter.

5. The computerized apparatus of claim 1 further comprising a policy employer configured to perform the second read-ahead policy in respect to a retrieval request from the storage system during the second phase.

6. The computerized apparatus of claim 5 further comprising a cache memory, the cache memory is utilized to retain a read-ahead data block retrieved by said policy employer.

7. The computerized apparatus of claim 1 further comprising a policies determination module configured to determine the read-ahead policies.

8. The computerized apparatus of claim 1 further comprising an input device for retrieving a bound selected from the group consisting of a maximal time for a retrieval request and a maximal amount of read-ahead data blocks.

9. The computerized apparatus of claim 1, wherein said reward calculator comprising an average retrieval time calculator.

10. The computerized apparatus of claim 1 further comprising an interface to the storage system.

11. The computerized apparatus of claim 1 further comprising a policy usage counter; said probability module is further configured to determine the probability also based on a usage count determined by the policy usage counter.

12. A method for determining read-ahead amount in a computerized environment, said method comprising:
   calculating a reward of performing a first read-ahead policy by a storage system during a first phase;
   determining a probability to select each of read-ahead policies based on the reward;
   selecting a second read-ahead policy based on the probability to select each of the read-ahead policies;
   performing read-ahead retrieval based on the second read-ahead policy during a second phase,
whereby a retrieval request from the storage system is transformed to comprise an additional read-ahead block.

13. The method of claim 12 further comprises determining an ending of the first phase and a beginning of the second phase.

14. The method of claim 13, wherein said determining the ending of the first phase comprises:
   determining an amount of data blocks read during the first phase; and
   determining that the amount of the data blocks satisfies a phase size constraint.

15. The method of claim 14, wherein said determining the ending of the first phase comprises:
   determining a time elapsed during the first phase; and
   determining that the time elapsed satisfies a phase timing constraint.

16. The method of claim 12 further comprises caching read-ahead block retrieved by said performing read-ahead retrieval.

17. The method of claim 12 further comprises determining the read-ahead policies.

18. The method of claim 12, wherein said determining the read-ahead policies comprises retrieving user input indicating the read-ahead policies.

19. The method of claim 12 further comprises determining a bound selected from a group consisting of a bound on retrieval request performance time and a bound on amount of read-ahead data blocks.

20. The method of claim 19 further comprises validating the bound.

21. The method of claim 12, wherein said calculating the reward comprises calculating average retrieval time during the first phase.

22. The method of claim 12, wherein said calculating the reward, said determining the probability to select each of the read-ahead policies and said selecting the second read-ahead policy are performed more than once.

23. The method of claim 12 further comprising determining a usage count associated with the first read-ahead policy; and wherein said determining the probability to select each of read-ahead policies is further based on the usage count.

24. A computer program product embodied on a computer readable storage media having computer code embodied therein for processing a method for determining read-ahead amount in a computerized environment, said method comprising:
   calculating a reward of performing a first read-ahead policy by a storage system during a first phase;
   determining a probability to select each of read-ahead policies based on the reward;
   selecting a second read-ahead policy based on the probability to select each of the read-ahead policies;
   performing read-ahead retrieval based on the second read-ahead policy during a second phase,
whereby a retrieval request from the storage system is transformed to comprise an additional read-ahead block.

* * * * *